US 8,776,041 B2

(12) United States Patent
Kachroo et al.

(10) Patent No.: US 8,776,041 B2
(45) Date of Patent: Jul. 8, 2014

(54) UPDATING A VIRTUAL MACHINE MONITOR FROM A GUEST PARTITION

(75) Inventors: Naveen K. Kachroo, Redmond, WA (US); Martin Taillefer, Redmond, WA (US); Lonny Dean McMichael, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1502 days.

(21) Appl. No.: 11/702,785

(22) Filed: Feb. 5, 2007

(65) Prior Publication Data
US 2008/0189697 A1 Aug. 7, 2008

(51) Int. Cl.
*G06F 9/44* (2006.01)
*G06F 9/445* (2006.01)

(52) U.S. Cl.
USPC ............ 717/169; 717/171; 717/175; 717/177

(58) Field of Classification Search
None
See application file for complete search history.

(56) References Cited

U.S. PATENT DOCUMENTS

| | | | |
|---|---|---|---|
| 5,023,771 A | | 6/1991 | Kishi |
| 5,701,491 A * | | 12/1997 | Dunn et al. ................... 717/167 |
| 5,974,250 A * | | 10/1999 | Angelo et al. ................ 713/100 |
| 6,006,034 A | | 12/1999 | Heath et al. .................. 717/170 |
| 6,167,567 A * | | 12/2000 | Chiles et al. .................. 717/173 |
| 7,103,529 B2 | | 9/2006 | Zimmer |
| 7,127,548 B2 | | 10/2006 | Bennett et al. |
| 7,130,949 B2 | | 10/2006 | Belmar et al. |
| 7,146,609 B2 * | | 12/2006 | Thurston et al. ............. 717/169 |
| 7,203,723 B2 * | | 4/2007 | Ogawa .......................... 709/203 |
| 7,251,812 B1 * | | 7/2007 | Jhanwar et al. .............. 717/171 |
| 2002/0124166 A1 * | | 9/2002 | Lee et al. ....................... 713/100 |
| 2003/0014738 A1 * | | 1/2003 | Dawkins et al. ............. 717/131 |
| 2003/0142351 A1 * | | 7/2003 | Sakura ......................... 358/1.15 |
| 2003/0217358 A1 * | | 11/2003 | Thurston et al. ............. 717/174 |
| 2003/0236754 A1 * | | 12/2003 | Thompson ..................... 705/64 |
| 2004/0199910 A1 * | | 10/2004 | Baack ........................... 717/171 |
| 2004/0243991 A1 * | | 12/2004 | Gustafson et al. ............ 717/168 |
| 2005/0060702 A1 | | 3/2005 | Bennett et al. |
| 2005/0081212 A1 | | 4/2005 | Goud et al. |
| 2005/0138360 A1 * | | 6/2005 | Kamalakantha ............. 713/156 |
| 2005/0172280 A1 * | | 8/2005 | Ziegler et al. ................ 717/168 |
| 2005/0246718 A1 * | | 11/2005 | Erlingsson et al. .......... 719/317 |
| 2005/0251806 A1 | | 11/2005 | Auslander et al. |
| 2006/0018264 A1 * | | 1/2006 | Yamakawa .................... 370/241 |
| 2006/0075076 A1 * | | 4/2006 | Sinha ............................ 709/220 |

(Continued)

OTHER PUBLICATIONS

Demerjian, C., "Intel Vaderpool holds promise, some pitfalls," the Inquirer: News, Reviews, Facts and Friction, http://www.theinquirer.net/default.aspx?article+21448, 2005, downloaded Dec. 4, 2006, 4 pages.

(Continued)

*Primary Examiner* — Jason Mitchell
(74) *Attorney, Agent, or Firm* — Micah Goldsmith; Micky Minhas

(57) ABSTRACT

Mechanisms are disclosed for updating a virtual machine monitor ("VMM"). Facilities of a guest operating system running in a guest virtual machine managed by the VMM are leveraged to facilitate receiving an update package. The update package may contain updates for guest operating systems extensions in addition to a VMM update. An updater process, running in a guest operating system, extracts the VMM update and transfers it down to the VMM. Upon successful transfer, the updater process applies any necessary updates to guest operating systems extensions and then signals the VMM to commit the transferred VMM update.

14 Claims, 5 Drawing Sheets

(56) References Cited

U.S. PATENT DOCUMENTS

| | | |
|---|---|---|
| 2006/0130060 A1 | 6/2006 | Anderson et al. |
| 2006/0143600 A1* | 6/2006 | Cottrell et al. ............... 717/168 |
| 2006/0248527 A1 | 11/2006 | Jaeckel et al. |
| 2006/0248528 A1 | 11/2006 | Oney et al. |
| 2006/0277546 A1* | 12/2006 | Rothman et al. .............. 718/103 |
| 2007/0074199 A1* | 3/2007 | Schoenberg .................. 717/168 |
| 2007/0220506 A1* | 9/2007 | Maruyama .................... 717/168 |
| 2008/0162983 A1* | 7/2008 | Baba et al. ....................... 714/3 |
| 2008/0244577 A1* | 10/2008 | Le et al. ............................ 718/1 |

OTHER PUBLICATIONS

Kaneda, K et al., "A virtual machine monitor for providing a single system image." Proceedings of the 17th IPSJ Computer System Symposium (ComSys' 05). 2005.

King, S.T. et al., "Operating System Support for Virtual Machines," Proceedings of the 2003 USENIX Technical Conference, 2003, 14 pages.

\* cited by examiner

UPDATING A VIRTUAL MACHINE MONITOR FROM A GUEST PARTITION

BACKGROUND

A virtual machine ("VM") is a software construct or the like operating on a computing device or the like (e.g., a host) for the purpose of providing an emulated machine or system. Typically, although not necessarily, the VM is an application or the like, and may be employed on the host to instantiate an application or the like while at the same time isolating such application from such host device or from other applications on such host. In one typical situation, the host can accommodate a plurality of deployed VMs, each VM performing some predetermined function by way of resources available from the host.

Notably, each VM as hosted on a computing device is for all intents and purposes a computing machine, although in virtual form, and thus represents itself as such both to the application thereof and to the outside world. As an example, the OS and/or an application thereof can and in fact do issue hardware requests for hardware resources of the VM, even though the VM might not in reality have such hardware resources. Instead, and as may be appreciated, such hardware requests are intercepted or otherwise redirected toward the host, with the requesting OS and/or application thereof either accessing virtualized hardware as it would physical hardware or communicating with the VMM through special VMM-provided interfaces.

Typically, although not necessarily, a host deploys each VM thereof in a separate partition, address space, processing area, and/or the like. Such host may include a virtualization layer with a virtual machine monitor or the like that acts as an overseer application or hypervisor, where the virtualization layer oversees and/or otherwise manages supervisory aspects of each VM of the host, and acts as a possible link between each VM and the outside world. The hypervisor may be a separate application running in its own address space or may be integrated more closely with a host operating system, either directly or as an operating system extension of some sort, such as a device driver. Notably, the hypervisor of the host may intercept or otherwise redirect hardware requests that originate from each VM of the host and/or an application thereof, and may at least assist in servicing the requests, again with the requesting VM and/or application thereof being none the wiser.

Many computing systems comprise multiple processors. Processors in a uniprocessor or multiprocessor virtual machine environment may operate in a guest mode or in a hypervisor mode. When running in a guest mode, a processor uses virtual machine definitions to manage the virtual machine's guest operating system and applications, translating arguments and managing system resources without intervention from the hypervisor. From time to time, the guest operating system or applications may need system resources that must be managed by the hypervisor. As examples, the hypervisor may be required for error handling, system faults, intercepts for emulating devices, or interrupt handling. In these situations, the processor operates in a hypervisor mode.

In some systems, processors are virtualized. A virtual processor is a software construct or the like operating on a computing device or the like for the purpose of providing an emulated processor. Multiple virtual processors can be implemented on a single physical processor or on multiple physical processors. One technique used to partition a computer into a number of virtual machines is to multiplex more than one virtual processor on one or more physical processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

VM technology has become important for providing a level of environment isolation and enhancing, for example, security, reliability, and compatibility. VM technology can be deployed in both server and client configurations. A virtual machine monitor ("VMM") creates and manages guest partitions containing virtual machines where guest operating systems can run isolated from other guest partitions and guest operating systems. In the past, VMMs commonly ran on top of a host operating system, making it possible for the VMMs to leverage host OS facilities for retrieving and applying update data.

Hardware support for virtualization is becoming more prevalent. It is possible to run a VMM directly on hardware, without using a host operating system to run the VMM or by using a relatively simple feature-poor operating system. A VMM running directly on hardware is sometimes referred to as a hypervisor. Hypervisors generally have significantly less complexity than full operating systems, due in part to a desire for greater performance and security. Without the services of a full-featured host operating system, a hypervisor or VMM may face challenges in relation to being updated or otherwise serviced.

Mechanisms for updating a virtual machine monitor using facilities from an operating system running in a guest partition are described herein. In some embodiments, software running on a guest operating system in a guest VM will receive update data. The data may be received, for example, from physical media or over a network connection. An updater process running on the virtual machine extracts virtual machine monitor update data from the received update data as well as any updates intended for the guest, if they are present. The guest VM may, if it is deemed trustworthy, perform validation on the update data, including, for example, checking a digital signature or verifying version information, or may defer validation to the VMM itself. The extracted VMM update data is transferred down to the VMM.

A communication mechanism by which software in the guest VM can communicate with the VMM may be provided. The VMM can signal the guest VM whether update data is successfully transferred, and, if the VMM is performing validation, whether the data has been successfully validated. The VMM and the guest VM work in a coordinated fashion to apply their respective updates.

DETAILED DESCRIPTION

Figure 1:
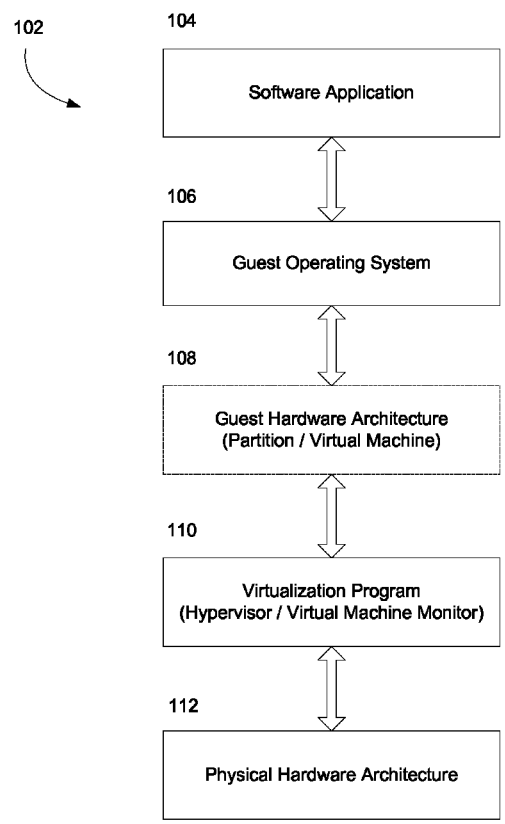
FIG. 1 is a block diagram representing the logical layering of the hardware and software architecture for a virtualized operating environment in a computer system.

Certain specific details are set forth in the following description and figures to provide a thorough understanding of various embodiments of the invention. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in logic realized with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Overview

Various methods and systems are described for updating a virtual machine monitor in a virtualized computing environment. In general, update data is received using facilities of a guest virtual machine running a guest operating system. Update data may be received, for example, from local physical media or over a network. An updater process running on the virtual machine extracts VMM update data and, possibly, guest OS update data. The VMM update data is transferred to the VMM and may be validated, either by the guest VM or by the VMM. A communications mechanism may be provided by which software running in the guest VM can communicate with the VMM. Updates to the VMM and to the guest OS, if present, are applied in a coordinated fashion.

Virtualization in General

Diversity in operating systems and processor instruction sets can lead to reduced interoperability of software. Memory and I/O abstractions, both in high-level languages and in operating systems can remove some hardware resource dependencies, but some remain. Many operating systems are developed for a specific system architecture and are designed to manage hardware resources directly. This can limit the flexibility of a computer system in terms of available software and operating systems and can negatively impact security and failure isolation, especially when a system is shared by multiple users.

Virtualization provides a mechanism for increasing flexibility while enhancing security and reliability. Processors, memory, and I/O devices are examples of subsystems that can be virtualized. When a subsystem is virtualized, a virtual interface and virtual resources available through the virtual interface are mapped onto the interface and resources of a real system on which the virtualization is implemented. Virtualization can be applied not only to subsystems, but to an entire machine. A virtual machine's architecture is implemented in a layer of software on a real machine.

From a conceptual perspective, computer systems generally comprise one or more layers of software running on a foundational layer of hardware. This layering is done for reasons of abstraction. By defining the interface for a given layer of software, that layer can be implemented differently from the other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be, for example, a virtual machine monitor that runs alongside a host operating system, a host operating system with a hypervisor component, where the hypervisor component performs the virtualization, or a software component that runs directly on hardware. The term virtual machine monitor is used as a general term for any of the various types of virtualization programs. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
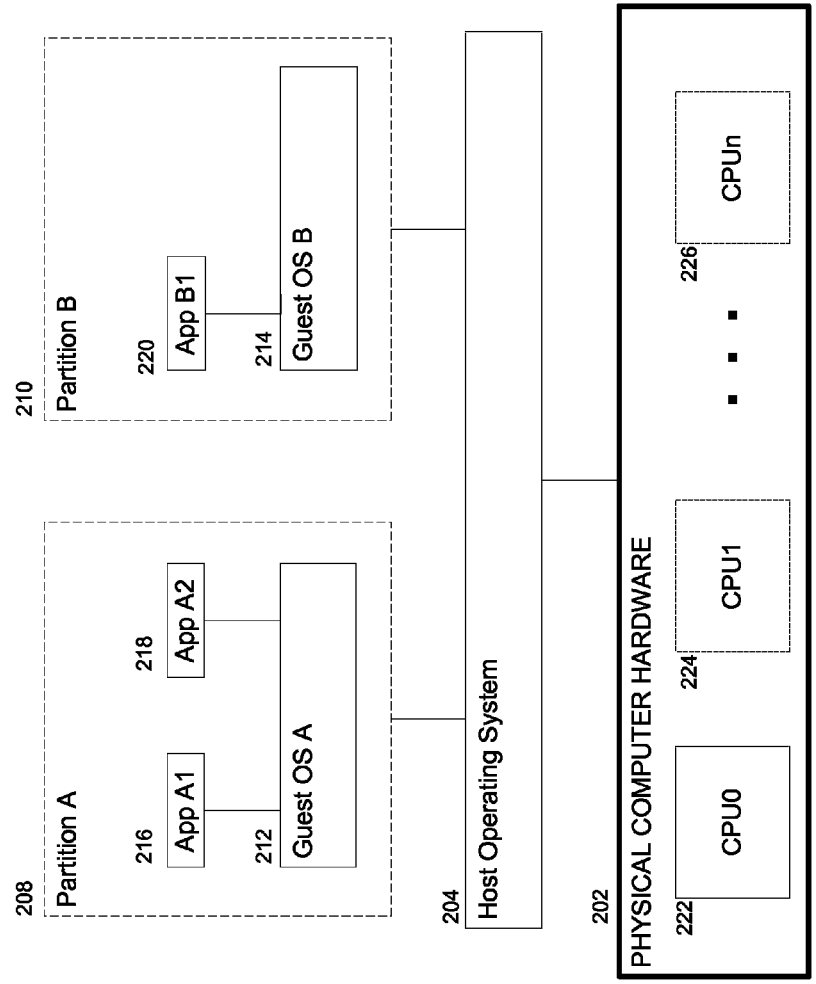
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel x86 processor, and partition B 210, which may be, for example, a virtualized version of a PowerPC processor. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that exist only as software constructs. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202. The physical computer hardware 202 may comprise a single central processing unit (CPU) 222, as in a uniprocessor environment, or multiple CPUs 222, 224, 226 as in a multiprocessor environment.

Figure 3:
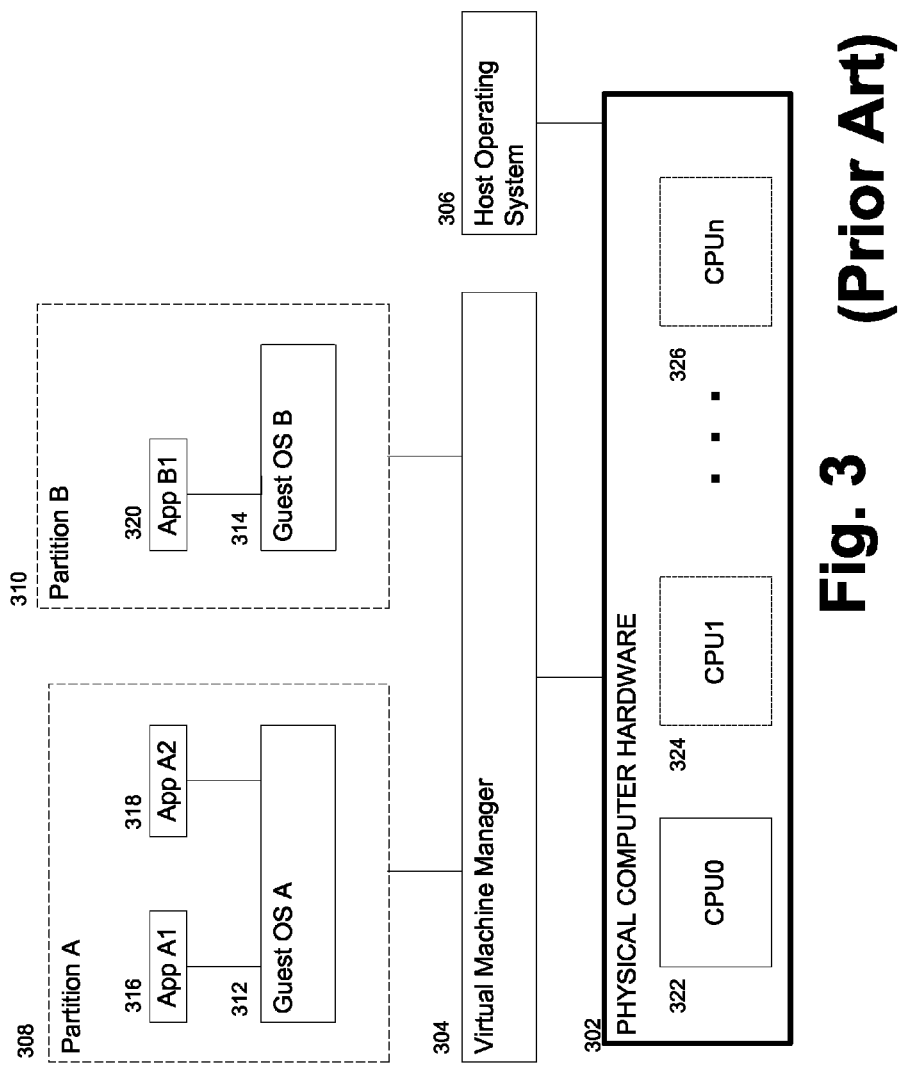
FIG. 3 is a block diagram representing an alternative virtualized computing system, where virtualization is performed by a virtual machine monitor running alongside a host operating system.

FIG. 3 illustrates an alternative virtualized computing system where the virtualization is performed by a hypervisor 304 running alongside the host operating system 306. In certain cases, the hypervisor 304 may be an application running above the host operating system 306 and interacting with the computer hardware 302 only through the host operating system 306. In other cases, such as shown in FIG. 3, the hypervisor 304 may instead comprise a partially independent software system that on some levels interacts indirectly with the computer hardware 302 via the host operating system 306, but on other levels the hypervisor 304 interacts directly with the computer hardware 302 (similar to the way the host operating system interacts directly with the computer hardware). And yet in other cases, the hypervisor 304 may comprise a fully independent software system that on all levels interacts directly with the computer hardware 302 (similar to the way the host operating system interacts directly with the computer hardware) without utilizing the host operating system 306 (although still interacting with the host operating system 306 in order to coordinate use of the computer hardware 302 and avoid conflicts and the like).

In the example illustrated in FIG. 3, two partitions, A 308 and B 310, lie conceptually above the hypervisor 304. Within each partition 308 and 310 are guest operating systems (guest OSs) A 312 and B 314, respectively. Running on top of guest OS A 312 are two applications, application A1 316 and application A2 318, and running on top of guest OS B 314 is application B1 320. The physical computer hardware 302 may comprise a single central processing unit (CPU) 322, as in a uniprocessor environment, or multiple CPUs 322, 324, 326 as in a multiprocessor environment.

Figure 4:
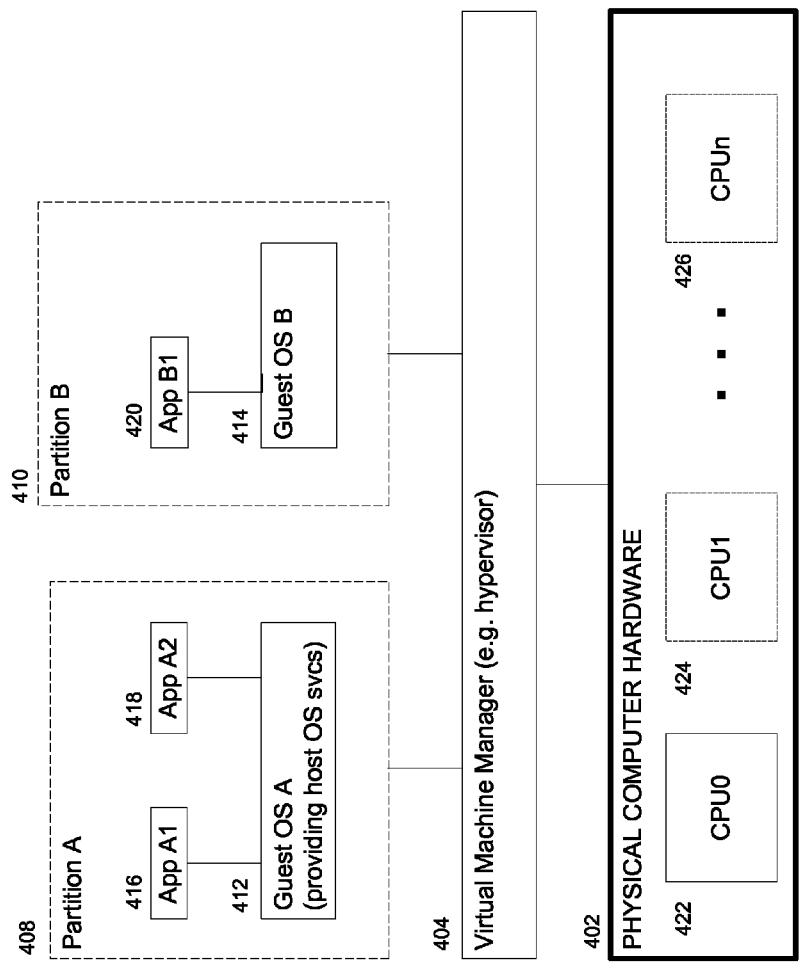
FIG. 4 is a block diagram representing another alternative virtualized computing system, where virtualization is performed by a virtualizer running independent of a host operating system.

FIG. 4 illustrates another alternative virtualized computing system where the virtualization is performed by a hypervisor 404. The hypervisor 404 comprises an independent software system that may interact directly with the computer hardware 402 without using a host operating system. The physical computer hardware 402 may comprise a single central processing unit (CPU) 422, as in a uniprocessor environment, or multiple CPUs 422, 424, 426 as in a multiprocessor environment.

In the example illustrated in FIG. 4, two partitions, A 408 and B 410, lie conceptually above the hypervisor 404. Within each partition 408 and 410 are guest operating systems (guest OSs) A 412 and B 414, respectively. Running on top of guest OS A 412 are two applications, application A1 416 and application A2 418, and running on top of guest OS B 414 is application B1 420. Guest OS A 412 provides host OS services. The physical computer hardware 402 may comprise a single central processing unit (CPU) 422, as in a uniprocessor environment, or multiple CPUs 422, 424, 426 as in a multiprocessor environment.

All of these variations for implementing the above mentioned partitions are just exemplary implementations and nothing herein should be interpreted as limiting the disclosure to any particular virtualization aspect.

As mentioned above, processors are one of the subsystems of a computing machine that can be virtualized. Each partition in a virtualized environment may be associated with one or more virtual processors. Processor virtualization enables a single physical processor to run multiple kernels that may involve multiple operating systems or multiple instances of the same operating system or a combination. There are two basic methods of processor virtualization, emulation and direct native execution, that can be used independently or combined. Emulation involves imitating, on virtualized resources, the exact actions that would have been performed by a given instruction on real resources. Emulation may be accomplished by, for example, interpreting each guest instruction in turn or by performing binary translation. Direct native execution involves the execution of guest instructions directly on the native hardware and is possible only under some circumstances where the instruction set architecture of the host is sufficiently similar to that of the guest. It may be desirable in some circumstances to provide a processor emulator to run on top of the hypervisor to emulate an instruction set architecture that differs from that of the physical processor.

Updating a Virtual Machine Monitor

Some virtual machine monitors run without a host operating system. One such configuration was described above in connection with FIG. 4, although other configurations are possible. Updating or servicing a VMM without the services of a host operating system, or with a limited host operating system, can present challenges. For example, a VMM might not include sophisticated networking, communications, or setup facilities. Systems and methods for updating a virtual machine monitor by leveraging facilities of a guest operating system are disclosed herein.

Figure 5:
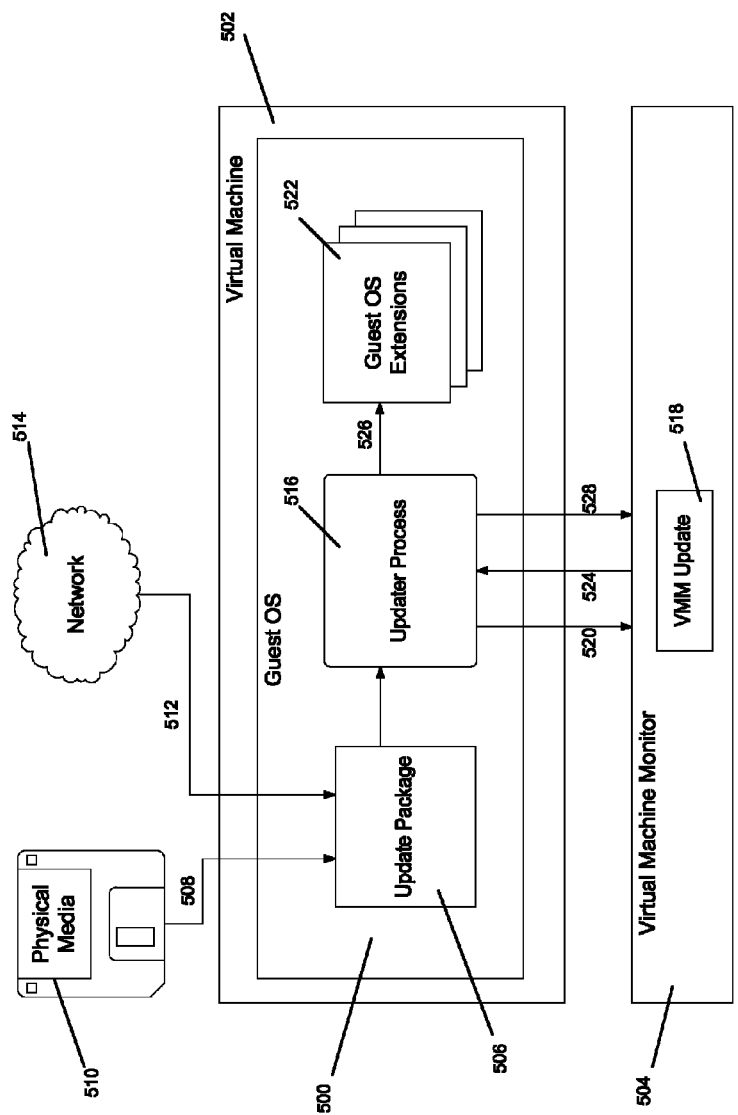
FIG. 5 is a block diagram depicting basic components of a virtualized computing system using an update process as disclosed herein.

FIG. 5 depicts an embodiment of a system in accordance with the teachings herein. A guest OS 500 runs on a virtual machine 502 under the management of a virtual machine monitor 504. An update package 506 is received by software running in the guest OS 500. The update package 506 may come from one or more various sources. As one example, the update package 506 may be supplied manually 508 by a user via physical media 510 such as, for example, CD, DVD, or floppy disk. As another example, the update package 506 may be retrieved 512 from a network location 514. Retrieval 512 from a network 514 may be initiated manually by a user or may be triggered automatically, such as in any of a number of well-known automatic update retrieval systems.

The update package 506 contains update data which may include a VMM update 518 as well as updates for the guest OS 500. The update data may comprise, for example, system component updates, service packs, security fixes, patches, and/or upgrades. The update package may also contain software to manage a portion of the update procedure.

An updater process 516 executes in the guest OS 500. The updater process 516 runs software that may be pre-installed in the guest OS 500 or may be retrieved along with the update package 506. The latter is generally preferable so that the updater process 516 may itself be updated as necessary. The updater process 516 manages the update procedure from the virtual machine 502 and assures that updates to the VMM 504 and the guest OS 500 take place in a coordinated manner so that updates on one and not the other do not render the VMM 504 and guest OS 500 incompatible. The updater process 516 extracts a portion of the update package 506 containing an update 518 for the VMM 504 and transfers it 520 down to the VMM 504.

The transfer 520 may be accomplished using a VMM-specific facility. Some examples include the use of a special op-code or communicating with a guest extension 522 that has a conduit to the VMM 504. The VMM 504 provides an interface to facilitate the transfer 520 by opening a communications channel having defined protocols to the guest OS 500. For example, in one embodiment an updater process 516 running within a VM 502 could fill a block of memory with the contents of a VMM update 518 to be handed down to the VMM 504. The updater process 516 could then call a special VM-provided API (for example via an interrupt, by setting a machine specific register, or the like) that would transfer control 520 to the VMM 504. The VMM 504 would then retrieve the update 518 from the block of memory and process it.

If the guest OS 500 is considered trustworthy by the VMM 504, it may perform validation on the VMM update 518 prior to transferring 520 the VMM update 518. Validation may include, for example, checking a digital signature or otherwise performing a cryptographic validation, or verifying a valid version. Alternatively, validation of the VMM update 518 may be performed by the VMM 504. If the VMM 504 performs its own validation on the VMM update 518, it signals 524 the updater process 516 to report the outcome of the validation.

If the VMM update 518 had been successfully transferred and verified, then the updater process 516 applies any necessary updates 526 to guest OS extensions 522 running in the guest VM 502. The guest OS extensions 522 may, among other duties, provide a communication mechanism by which software in the guest VM 502 can communicate with the VMM 504. If the VMM update 518 is not successfully transferred and verified, updates to guest OS extensions 522 are not applied. Because the operations of the guest OS extensions 522 may be closely tied to the behavior of the VMM 504, the update to the guest OS extensions 522 may be configured so that the update will not take effect until the VMM update 518 is committed. This may require a VM restart or even a machine restart. Failure to coordinate updates to the VMM 504 and the guest OS extensions 522 could create undesirable consequences and could even render the system inoperable.

Once the guest OS extensions 522 are successfully updated, the updater process 516 signals 528 the VMM 504 which responds by committing the VMM update 518. The committed update may take place immediately or may require a restart of the guest VM 502 or even the physical machine itself.

While the present disclosure has been described in connection with various embodiments, illustrated in the figures, it is understood that similar aspects may be used or modifications and additions may be made to the described aspects of the disclosed embodiments for performing the same function of the present disclosure without deviating therefrom. For example, in various aspects of the disclosure, mechanisms were disclosed for receiving an update package. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for updating a virtual machine monitor, the method comprising:
   receiving update data using facilities of a guest operating system;
   extracting by the guest operating system a first portion of the update data that is intended for the virtual machine monitor;
   transferring the first portion of the update data to the virtual machine monitor;
   receiving by the guest operating system a signal from the virtual machine monitor to indicate a successful result of validating the first portion of the update data;
   extracting a second portion of the update data intended for the guest operating system;
   applying the second portion of the update data to update the guest operating system in response to the signal indicating the successful result of validating by the virtual machine monitor the first portion of the update data intended for the virtual machine monitor; and
   applying the first portion of the update data to update the virtual machine monitor.

2. A method as recited in claim 1, wherein receiving update data comprises receiving update data using a web browser application.

3. A method as recited in claim 1, wherein transferring the first portion of the update data comprises:
   initiating an updater process on the guest operating system; and
   communicating the first portion of the update data to the virtual machine monitor.

4. A method as recited in claim 3, wherein communicating the first portion of the update data to the virtual machine monitor comprises opening a communication channel between the guest operating system and the virtual machine monitor.

5. A method as recited in claim 3, wherein initiating the updater process comprises:
   extracting instructions for the updater process from the received update data; and
   launching the updater process on the guest operating system wherein the updater process executes at least some of the extracted instructions.

6. A method as recited in claim 1, wherein the applying of the first portion of the update data to update the virtual machine monitor and the applying of the second portion of the update data to update the guest operating system are coordinated.

7. A system comprising:
   a physical processor;
   a virtual machine monitor configured to execute on the physical processor; and
   a guest operating system configured to execute under control of the virtual machine monitor; and
   a virtual machine monitor updater configured to execute on the guest operating system to extract a first portion of update data intended for the virtual machine monitor, to transfer the first portion of the update data to the virtual machine monitor, to receive a signal from the virtual machine monitor to indicate a successful result of validating the first portion of the update data, to extract a second portion of the update data intended for the guest operating system and to apply the second portion of the update data to update the guest operating system in response to the signal indicating the successful result of validating by the virtual machine monitor the first portion of the update data intended for the virtual machine monitor.

8. A system as recited in claim 7, further comprising a browser application for receiving the update data.

9. A system as recited in claim 7, further comprising a communications interface configured to facilitate communication between the guest operating system and the virtual machine monitor.

10. A system as recited in claim 7, wherein the system comprises a game playing console comprising the physical processor.

11. A system as recited in claim 7 wherein the virtual machine monitor comprises an emulator for emulating an instruction set architecture that differs from the instruction set architecture of the processor.

12. A tangible computer readable storage medium, wherein the medium is not a signal, comprising computer executable instructions for managing an update to a virtual machine monitor, the computer executable instructions comprising instructions for:
   receiving update data using facilities of a guest operating system;
   extracting by the guest operating system a first portion of the update data that is intended for the virtual machine monitor;
   transferring the first portion of the update data to the virtual machine monitor;
   receiving by the guest operating system a signal from the virtual machine monitor to indicate a successful result of validating the first portion of the update data;
   extracting a second portion of the update data intended for the guest operating system;
   applying the second portion of the update data to update the guest operating system in response to the signal indicating the successful result of validating by the virtual machine monitor the first portion of the update data intended for the virtual machine monitor; and
   applying the first portion of the update data to update the virtual machine monitor.

13. A tangible computer readable storage medium as in claim 12, wherein the computer executable instructions further comprise instructions for providing a communications channel between the guest operating system and the virtual machine monitor.

14. A tangible computer readable storage medium as in claim 13, wherein the applying of the first portion of the update data to update the virtual machine monitor and the applying of the second portion of the update data to update the guest operating system are coordinated.

* * * * *